July 4, 1950 S. J. WILDER 2,513,981
CLOTHESPIN
Filed June 18, 1948

INVENTOR.
Shepard J. Wilder,
BY
Parker, Rochmon & Farmer,
Attorneys.

Patented July 4, 1950

2,513,981

UNITED STATES PATENT OFFICE 2,513,981

CLOTHESPIN

Shepard J. Wilder, Concord, N. H.

Application June 18, 1948, Serial No. 33,797

1 Claim. (Cl. 24—138)

This invention relates to clothespins for use in connection with clamping clothes to clotheslines.

One of the objects of this invention is to provide a clothespin of improved construction which grips the clothes more securely to the clothesline by producing a slight bend in the line when the clothespin is applied thereto. A further object is to provide a clothespin of this type which will be exceptionally resistant to splitting or breaking due to pressures on the legs of the pin resulting from the forcing of the same on the line. Other objects and advantages of this invention will appear from the following description.

The clothespin may be made of wood or any other suitable material and includes a body or handle portion 8 by means of which the clothespin may be handled or manipulated. This body portion may, if desired, be provided near the upper end thereof with transversely extending notches or grooves 9 which facilitate the handling of the clothespin. One end of the body portion terminates in a pair of legs 10 and 11 which are formed integral with the body portion. The clothespin is preferably approximately rectangular in cross section.

Figure 6:
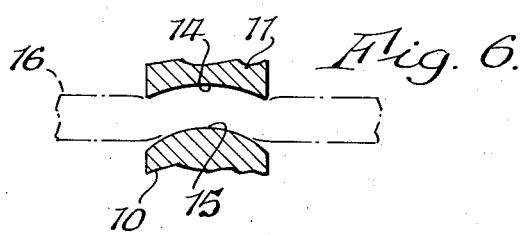
Fig. 6 is a fragmentary sectional view similar to that shown in Fig. 6, but illustrating the application of the clothespin to a clothesline.

In clothespins as heretofore made, the legs were generally formed by cutting a tapering slot straight across the clothespin from one side thereof to the other to bifurcate the lower portion thereof, thus forming the legs of the pin. In my improved clothespin, the legs are spaced apart by means of a tapering slot which is arc-shaped in cross section. This arc-shaped slot thus forms on the leg 11 a concave inner surface 14 and forms on the other leg 10 a convex inner surface 15, the convex and concave surfaces of the two legs facing each other. As a result of this construction, it will be noted that when the clothespin is applied to a line as illustrated in Fig. 6, the middle portion of the convex face of the leg 10 and the edge portions of the concave inner face of the leg 11 will engage a clothesline 16 in such a manner as to produce a slight bend or curvature in the portion of the line engaged by the clothespin. This provides an excellent grip on any article of clothing which may be suspended from the line in that there are three definite points of contact of the legs of the clothespin with the line, thus providing a very secure grip. Furthermore, in case of a wind, when it is most desirable to secure the clothes firmly to the line, the pressure of the wind acting on the clothes will produce an increased tension on the line, and this increased tension provides increased pressure at the three points of contact of the clothespin with the line, since the increased tension on the line will tend to straighten the line. Consequently, with an improved clothespin, the more the wind acts on the clothes to remove them from the line, the tighter they will be gripped by means of the pin.

Figure 1:
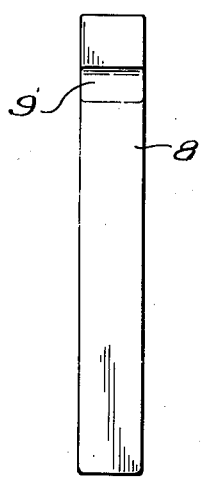
Fig. 1 is a view of one side of a clothespin embodying this invention.
Figure 2:
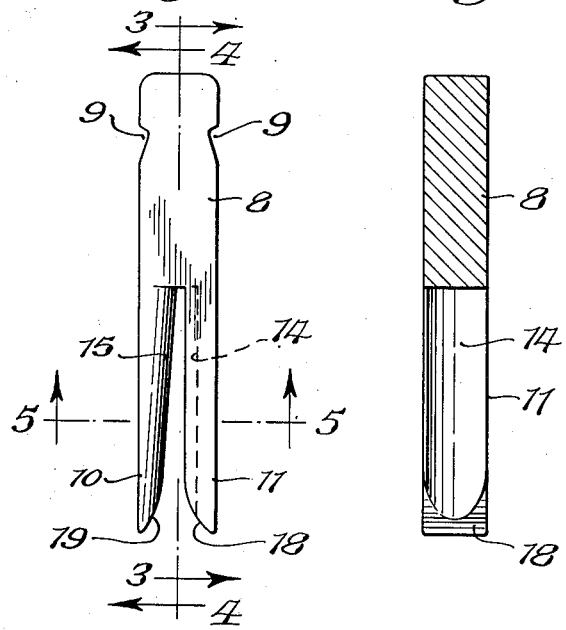
Fig. 2 is a view of an adjacent side thereof.
Figure 3:
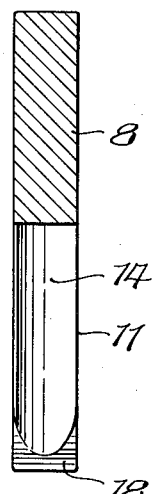
Fig. 3 is a central sectional elevation thereof, on line 3—3, Fig. 2.
Figure 4:
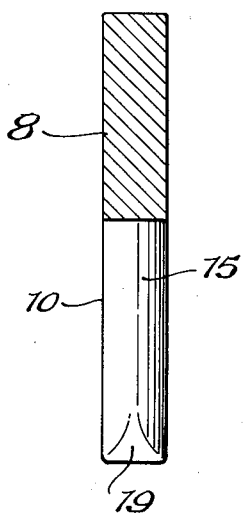
Fig. 4 is a longitudinal central sectional view thereof, on line 4—4, Fig. 2.
Figure 5:
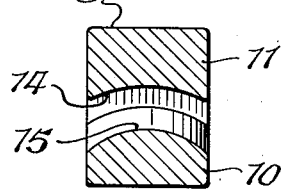
Fig. 5 is a transverse sectional view thereof, on an enlarged scale, on line 5—5, Fig. 2.

By means of the arcuate slot between the legs of the clothespin and the convex and concave faces of the legs, the strength of the clothespin or its resistance to breaking is greatly increased. When clothespins of this type are made of wood, they generally break either by having the pins split lengthwise of the body portion, or by having the legs break off at their junction with the body portion. By providing the legs with concave and convex surfaces as herein described, these legs will be of structural shape in cross section, the leg 11 being of somewhat channel-shape in cross section, and the leg 10 having a dimension from the apex of the convex portion thereto to the opposite side of the leg which will be greater than would be possible if a straight slot were used to form the legs, as is common practice in clothespins as now generally used. For example, in the clothespins shown at the juncture of the leg 10 with the body portion 8 of the clothespin, the apex of the convex surface extends approximately to the longitudinal central plane of the clothespin, which is represented by the section line 3—3 in Fig. 2. It would, of course, be impossible if a straight slot were used to have a portion of one of the legs extend approximately to this central longitudinal plane of the clothespin, without greatly weakening the other leg. The increased thickness of a portion of the leg 10, consequently, greatly increases the resistance of this leg against breaking at the juncture at the body portion of the pin. Similarly in connection with the leg 11, the substantially U-shaped portion of the leg greatly increases the resistance of this leg to breakage as is well recognized in case of structural metal members of channel or U-shape. The opposite sides of the leg 11 at the ends of the concave portion thereof can because of the arc-shaped slot, extend into greater proximity to the longitudinal central plane of the clothespin so that the leg 11 also offers materially greater resistance to breaking than in the case of clothespins having a straight slot separating the legs of the pin in place of the arcuate slot employed in my improved pin. The fact that the clothespin is of approximately rectangular cross section also increases its resistance to breaking.

The particular cross sectional shape of the legs of my improved clothespin also offer increased resistance to the splitting of the body portion of the pin lengthwise thereof.

I have also found that better results can be obtained if one of the legs of the clothespin is made substantially straight throughout the greater portion of the length thereof, and in the construction illustrated by way of example, the leg 11 is made substantially straight or of uniform cross section from the body portion of the pin to a point adjacent to the outer end of the leg. The outer end portion of this leg is flared outwardly as indicated at 18 to facilitate the application of the pin to a clothesline and a similar outwardly flaring portion 19 is provided on the end of the other leg 10. I have found that by making the leg 11 of substantially uniform cross sectional area throughout the greater portion of the length thereof, I obtain increased holding power of the clothes or fabrics on the line on which they are hung. Furthermore, the structural cross sectional shape of the leg 11 is such as to resist bending, and consequently, I prefer to taper the leg 10 because of its greater flexibility so that in using clothespins of my improved type on clotheslines of varying thicknesses or with clothes of varying thickness, the greater part of the flexing will occur in the convex-faced leg 10 so that this leg will yieldingly force the clothes and the clothesline into the concavity of the leg 11. When thinner materials are used on the clothesline, the pin has a tendency to increase the force or pressure applied to the material and the line.

Clothespins constructed in accordance with my invention are particularly desirable for use in suspending textiles made of very smooth and slippery materials, such for example as silk, nylon, or the like, from which ordinary clothespins as now generally used tend to become disengaged because of the slipperiness of the material. By applying a three-point gripping of the material on the line and providing a slight curving of the portion of the line engaged by the clothespin, a very secure and rigid holding of such slippery materials on a clothesline results.

It will be understood that various changes in the details, materials, and arrangements of parts which have been herein described and illustrated in order to explain the nature of the invention, may be made by those skilled in the art within the principle and scope of the invention, as expressed in the appended claim.

I claim as my invention:

A clothespin comprising an elongated body portion substantially rectangular in cross section and having at one end thereof a pair of legs separated from each other by an outwardly diverging slot which is arcuate in cross section, the unslotted portion of said pin being more than one-third and less than one-half of the length of said pin, one of said legs having a substantially straight back and substantially straight sides and a concave surface facing the other leg, and the other leg having a substantially flat back and having a convex surface facing the first mentioned leg, each of said legs extending from one side of the clothespin to the opposite side thereof, the inner surfaces of the outer ends of the legs flaring outwardly to facilitate applying the pin to a clothesline, said leg having the concave surface being substantially uniform in cross section from the inner end of said slot to said outwardly flaring end portion, and said other leg tapering from the inner end of said slot to said outwardly flaring end portion and being of smaller cross-sectional area than the concave leg for the major portion of their lengths to provide greater flexibility of said convex leg than said concave leg.

SHEPARD J. WILDER.

REFERENCES CITED

The following references are of record in the file of this patent:

UNITED STATES PATENTS

| Number | Name | Date |
|---|---|---|
| 1,894,121 | Pronnecke | Jan. 10, 1933 |

FOREIGN PATENTS

| Number | Country | Date |
|---|---|---|
| 278,602 | Germany | Oct. 1, 1914 |
| 514,867 | France | Nov. 19, 1920 |